Oct. 23, 1923.
H. A. SANGREN
1,471,360
STRAP FASTENER FOR EYEGLASSES
Filed April 18, 1922
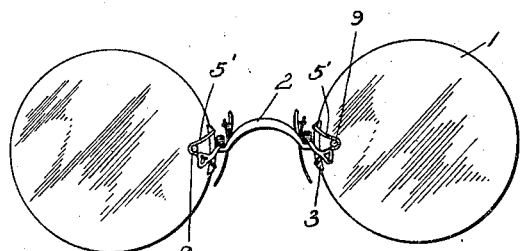
FIG. I
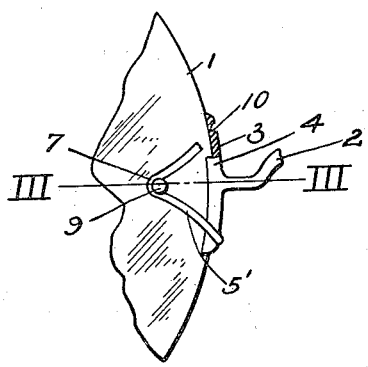
FIG. II
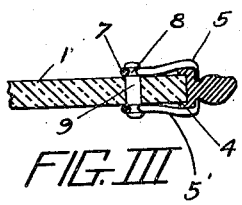
FIG. III
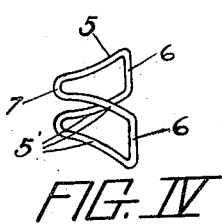
FIG. IV
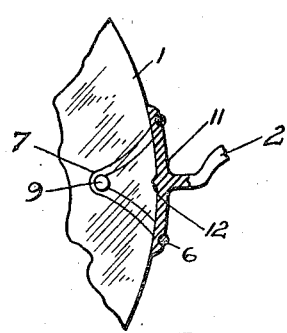
FIG. V
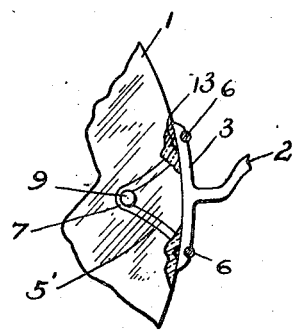
FIG. VI
INVENTOR
H. A. SANGREN
BY
ATTORNEYS Patented Oct. 23, 1923.

1,471,360

UNITED STATES PATENT OFFICE.

HARRY A. SANGREN, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

STRAP FASTENER FOR EYEGLASSES.

Application filed April 18, 1922. Serial No. 555,203.

*To all whom it may concern:*

Be it known that I, HARRY A. SANGREN, a citizen of the United States, residing at Southbridge, in the county of Worcester and State of Massachusetts, have invented certain new and useful Improvements in Strap Fasteners for Eyeglasses, of which the following is a specification.

This invention relates to new and useful improvements in eyeglasses and more particularly to means for providing a reliable connection between the nose-piece or frame and the lenses. The main object of the invention is the provision of a fastener which can be quickly and readily applied or removed and which will at the same time securely retain the lenses in their proper relative positions with respect to the nosepiece and frame.

A further object of the invention is the provision of a fastening device including a resilient stirrup having a portion thereof engaging the strap with an additional portion engaging the headed pin extended through the lens, with curved portions intermediate the above mentioned portions whereby any tendency on the part of the strap-engaging portions to spread will bring the pin-engaging portions tightly against the pin so as to securely retain the various parts of the fastener in their respective positions.

Another object of the invention is the provision of a fastening device of the above character whereby a reliable connection can be made between the nose bridge or frame and the lenses, said connection being formed of such material and so arranged that it can be quickly and readily applied to the lenses and nose piece or frame or detached therefrom.

A still further object of the invention is the provision of a connection between the nosepiece or frame and the lenses wherein a resilient stirrup is employed so that when the lenses are fastened in their respective positions both the lenses and the straps of the parts to which the lenses are attached will be joined tightly together and eliminate any loose play between the lenses and the frame or nosepiece.

With the above and other objects in view the invention consists in the novel features of construction and the combination and arrangement of parts hereinafter more fully set forth, pointed out in the claims and shown in the accompanying drawings, in which—

Figure I is a front elevation of a pair of eyeglasses constructed in accordance with my invention;

Figure II is a detail elevation, parts thereof being broken away and illustrated in section;

Figure III is a transverse sectional view taken on the line III—III of Figure II;

Figure IV is a detailed perspective view of the fastening stirrup;

Figure V is a vertical sectional view taken through the nosepiece strap illustrating a slightly modified form of the invention; and Figure VI is a detailed side elevation of one fastener, parts thereof being broken away and illustrated in section.

Referring now more particularly to the drawings in which my invention is fully illustrated, the numeral 1 indicates the lenses, and arranged between the lenses is the nose bridge 2 having lens-engaging straps 3 at each end thereof, said straps in the present instance being channel-shaped to provide the parallel flange portions 4 adapted to engage the opposed faces of the lens whereby to prevent any lateral movement on the part of the straps when placed in their respective positions as shown in Figures I and II.

My improved resilient stirrup employed in fastening the strap to the lens comprises two spaced V-shaped members 5 integrally connected by the cross pieces 6. In applying the stirrup for use in forming a connection between the lens and the strap 3, the cross portions 6 are engaged over the ends of the strap and then by pressing these cross portions toward each other the looped ends 7 of the stirrup will be forced outwardly for engagement with the grooves 8 formed at each end of the securing pin 9. This pin 9 is arranged within the opening in the lens and is used in place of the ordinary screw which fastens the strap to the lens. After the looped portions 7 are engaged with the grooves 8 of the pin 9 the cross portions 6 are released, the resiliency of the members 5 moving said cross portions away from each other toward the ends of the strap.

In order to prevent any inward movement on the part of the cross portions 6 the straps 3 are provided with transverse channels 10 adapted to receive the cross portions 6 after the loops 7 have been engaged with the headed pin, and from this it will be apparent that while the cross portions 6 are retained against movement inwardly toward each other, the slightly curved portions 5' will tend to force these cross portions away from each other so that it may be possible to permit the cross portions to move away from each other at a point beyond the channels 10 and still be effective in retaining the loop 7 in engagement with the pin 9, but at the same time these curved portions 5' will tend to resist any inward movement on the part of the cross portions 6 so that it will be rather difficult for these cross portions to move inwardly toward each other beyond the cross channels 10 and thus the loops 7 will be securely retained in engagement with the pins 9.

In Figure V I have illustrated a slightly modified form of the invention wherein the flanged portions 4 on the straps are eliminated, and in place of these flanged portions a spur member 11 is formed on the inner face of the strap and adapted to engage within a notch 12 formed in alinement with the pin-receiving opening in the lens. This spur 11 is preferably for the purpose of preventing any lateral movement on the part of the strap when fastened by means of the resilient stirrup to the headed pin 9.

In Figure VI I have illustrated another form of the invention wherein I provide two spaced studs 13 adapted to engage within similarly shaped notches formed in the edge of the lens 1. These studs 13 are preferably arranged in equal distance upon opposite sides of the pin 9 so as to prevent any turning or lateral movement on the part of the strap 3, the cross portions 6 of the stirrup retaining the straps 3 against any movement circumferentially of the edge of the lens.

From the above description taken in connection with the accompanying drawings it will be readily apparent that I have provided a reliable and efficient connection between the nosepiece or frame and the lenses which can be quickly and readily applied and which at the same time will serve to retain the lenses in their proper positions with respect to the nose piece or frame. In placing the stirrup in position, the cross portions 6 can be moved toward each other upon the strap 3 until the looped portions 7 engage within the channels 8 formed at the ends of the pin 9. Upon release of cross portions 6 the resiliency within the curved portions 5' will tend to force the cross portions 6 away from each other and to draw the looped portions 7 into contact with the channels 8, thus securing the stirrup in position and at the same time providing for sufficient resiliency in the curved portions 5' whereby to permit a slight movement on the part of the stirrup without in any way changing the position of the lenses.

I claim:

1. A device of the class described, including in combination a lens, a strap engaging the edge of the lens, a resilient stirrup including spaced V-shaped members adapted to be arranged upon opposite sides of the lens, cross portions connecting said V-shaped members and having engagement with the strap, looped portions at the ends of the V-shaped members and a pin carried by the lens having its ends channeled and engaged with said looped portions.

2. A device of the class described, including a lens, a pin carried thereby having a channeled portion at each end forming a head, a strap engaging the edge of the lens, flanges carried by the strap and engaging opposed faces of the lens, a resilient strap having portions thereof engaging the ends of the pin, and additional portions engaging the strap as and for the purpose set forth.

3. A device of the class described including in combination a lens, a headed pin carried thereby, a strap engaging the edge of the lens having transverse channels in its outer face, a resilient stirrup comprising opposed V-shaped portions, cross members connecting said V-shaped portions, said cross members being adapted to be forced toward each other for engaging the ends of the side portions with the headed pin, and means for limiting the movement of said cross portions upon releasing the same.

4. A device as indicated, including a lens, a pin carried thereby, a strap engaging the edge of the lens, a resilient stirrup having transverse members overlying the exterior edges of the strap adjacent its extremities and provided with converging parts on opposite sides of the lens with operative connections with the opposite ends of the pin whereby the transverse members of the stirrup may bear yieldably upon and retain the ends of the strap against the edge of the lens.

5. A device as indicated, including a lens, a pin with its opposite ends headed, carried thereby, a strap engaging the edge of the lens, a resilient stirrup having transverse members overlying and bearing against the exterior edge of the strap adjacent its extremities, and provided with converging parts on opposite sides of the lens with operative connections with the heads of the pin whereby the transverse members may bear yieldably upon and retain the strap against the lens edge, said operative connections being detachable without removing the pin.

HARRY A. SANGREN.